March 13, 1951 J. W. BARNES 2,544,647
CLOSURE LATCH
Filed May 28, 1947 2 Sheets-Sheet 1
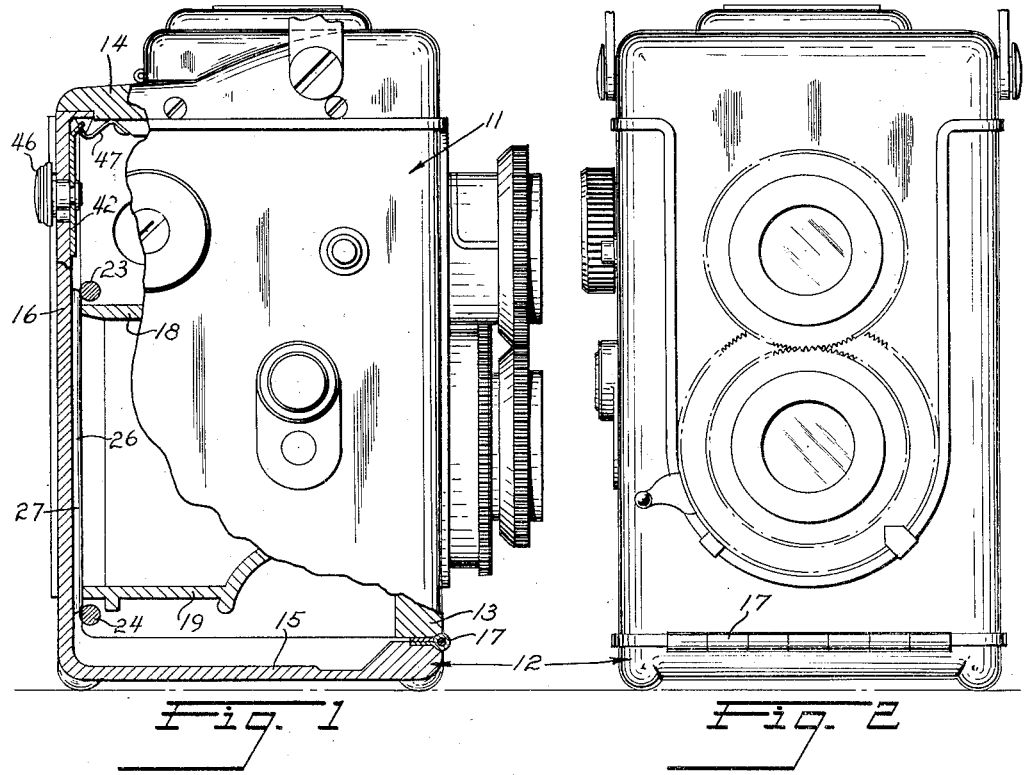
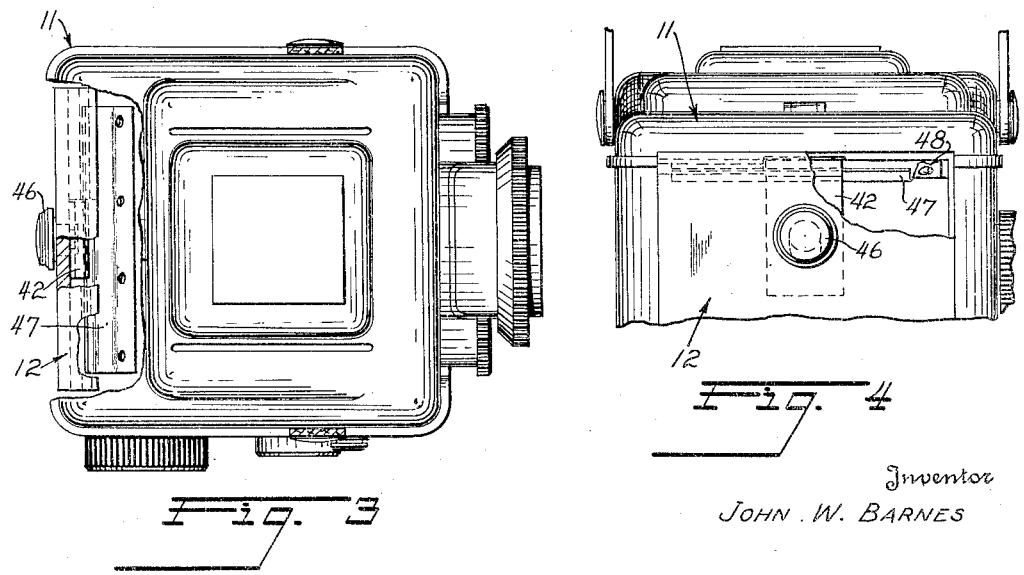
Inventor
JOHN W. BARNES
By Strauch & Hoffman
Attorneys

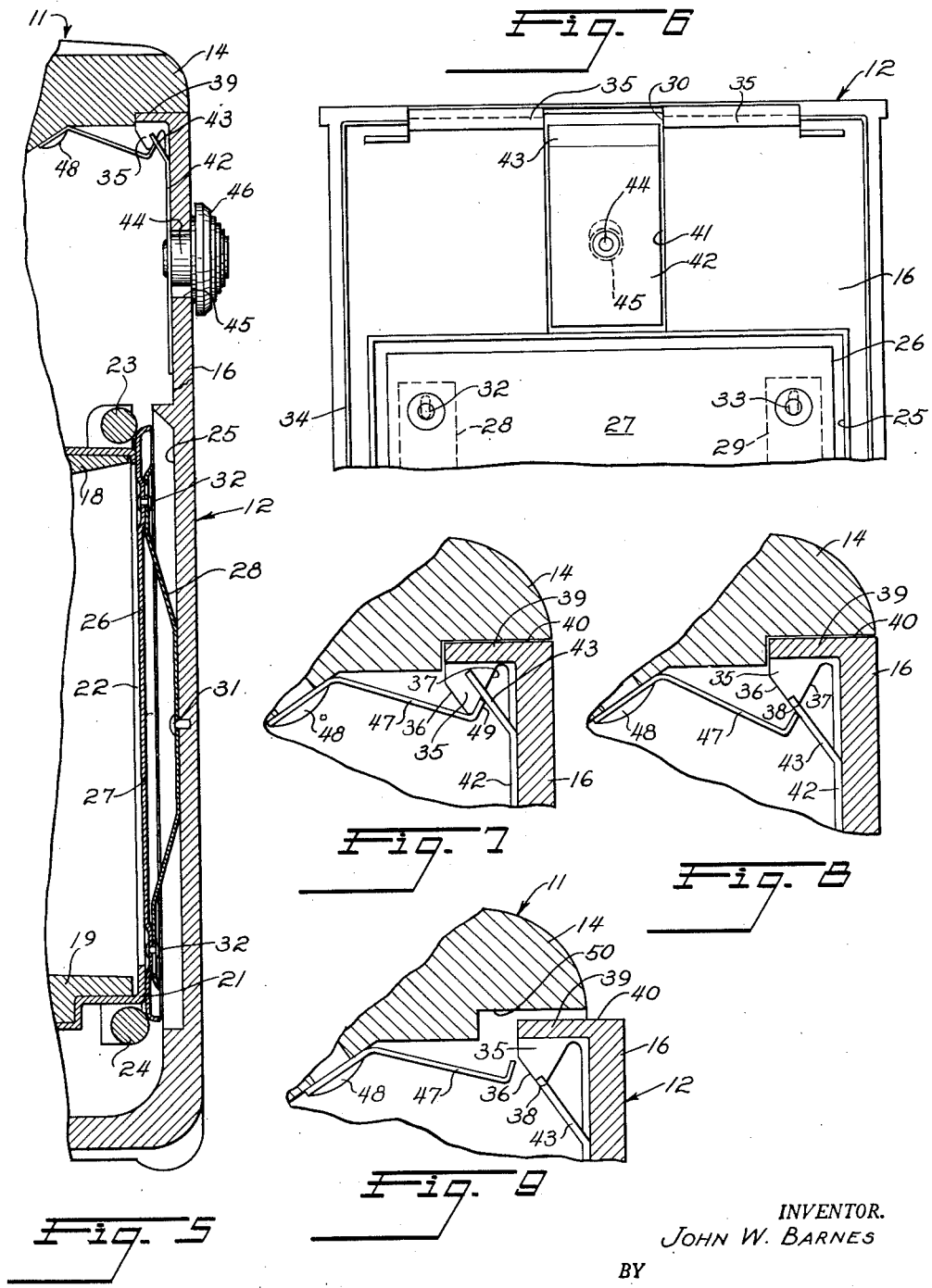

Patented Mar. 13, 1951

2,544,647

UNITED STATES PATENT OFFICE 2,544,647

CLOSURE LATCH

John W. Barnes, Ann Arbor, Mich., assignor to Argus, Incorporated, Ann Arbor, Mich., a corporation of Michigan Application May 28, 1947, Serial No. 750,952

2 Claims. (Cl. 292—254)

1

This invention relates to closures for cameras and like receptacles that are opened and closed repeatedly during their life and wherein the closure must be efficiently and tightly latched against accidental opening during normal handling.

In its preferred embodiment the invention will be described as a cover latch for the hinged back of a camera, for which it is particularly useful. In a camera cover or back that must be opened every time a roll of film is inserted or removed, the requirements are rigid that the latch be easily opened at the will of the ordinary user, but proof against accidental opening which would expose and ruin the sensitive film and the latch must be strong enough to hold the cover tight to avoid possible light leaks. The latch of the present invention meets these requirements through a mechanically simple construction employing a novel combination of spring and associated elements.

It is therefore the major object of this invention to provide a novel closure latch construction for a camera or like receptacle that is easily and positively opened when desired.

A further object of the invention is to provide a novel closure and latching arrangement wherein a hinged closure is positively held in closed position by a spring latch that may be positively released by means of an externally accessible operating member.

It is a further object of the invention to provide, in a camera or like receptacle having a hinged closure, a spring latch member on the receptacle body adapted to coact with a suitable formation on the closure, together with a shiftable externally accessible operator for positively separating the latch member and formation.

Further objects of the invention will presently appear as the description proceeds in connection with the appended claims and the annexed drawings wherein:

Figure 1 is a side elevation, partly broken away and in section, illustrating the hinged cover of a camera provided with a latch according to a preferred embodiment of the invention;

Figure 2 is a front elevation of the camera of Figure 1, illustrating the hinged front end of the cover;

Figure 3 is a top plan view of the camera of Figure 1, partly broken away to illustrate certain details of the latch;

Figure 4 is a rear elevation of the camera, partially broken away to illustrate further details of the latch;

Figure 5 is an enlarged fragmentary side elevation in section illustrating cooperation of the hinged cover of the camera with the camera body, and also details of the latch and the film pressure plate which is mounted on the interior of the cover;

Figure 6 is an elevation view at the front of the hinged cover, illustrating particularly the mounting of the shiftable release member for the latch;

Figure 7 is an enlarged fragmentary side elevation in section, illustrating the position of the latch elements when the camera cover is closed;

Figure 8 is a fragmentary view in section similar to Figure 7, illustrating the relative position of the latch elements when the shiftable member of the latch has been pulled downwardly sufficiently to release it; and Figure 9 is a further section like Figure 7, illustrating the position of the latch elements with the camera cover slightly open.

The twin lens reflex camera selected for disclosure of the invention comprises a body 11 having a cover 12. Body 11 comprises a front wall 13, parallel side walls and a top wall 14. Cover 12 comprises the bottom wall 15 and rear wall 16 of the camera. Cover 12 is pivoted upon body 11 by an elongated hinge 17 joining the front end of bottom wall 15 and the lower end of front wall 13, the pivot axis of hinge 17 being perpendicular to the body side walls and so located that during opening movement of cover 12 all parts of the cover move away from body 11.

Internally body 11 is provided with generally parallel rearwardly extending upper and lower walls 18 and 19 which cooperate with the body side walls to define a light tight passage between the lens and the film gate. The film gate comprises a flat vertical film track plate assembly 21 mounted on the rear ends of walls 18 and 19 to provide an exposure aperture 22 and includes parallel upper and lower idler rollers 23 and 24 for the film.

Rear wall 16 of the cover is interiorly recessed at 25 in its lower end opposite the film gate and a film pressure plate 26, which preferably comprises a metal plate having a polished low friction surface 27 adapted to press against the back of the film, is flexibly mounted in the recess by means of parallel vertical leaf spring bows 28 and 29 riveted intermediate their ends as at 31 to wall 16 and slidably connected to rivets on the pressure plate 26 at opposite ends as at 32 and 33. When cover 12 is closed, as in Figure 5, and there is a film threaded over rollers 23 and 24 and over the film gate, the front surface 27 of pressure plate 26 contacts the back of the film to press and resiliently hold it flat against the film track.

Referring to Figure 6, the interior of cover 12 is formed around most of its periphery with a projecting rim 34 adapted to fit with a corresponding groove in the associated edges of the body walls to provide a light trapping joint. Along the top of wall 16, this rim is interrupted to provide a downwardly extending ledge or keeper 35 which, as illustrated best in Figures 7–9, is formed with a rearwardly and downwardly sloping front face 36 and a rearwardly and upwardly sloping rear face 37 joined by a rounded tip 38. As illustrated at 30 in Figure 6, ledge 35 is medially interrupted for a purpose to appear. Ledge 35 is integrally formed on a forwardly projecting flange 39 on the upper end of wall 16 so that ledge 35 is disposed forwardly of the inner surface of wall 16. The top of flange 39 has a flat surface 40 adapted to mate with the corresponding flat surface of a shallow downwardly facing edge groove 50 on top wall 14, this arrangement insuring that the back and top walls of the camera have a light tight joint.

Above recess 25, the interior of wall 16 is formed with a relatively narrow central guide recess 41 in which a flat metal latch release plate 42 is slidably guided for vertical reciprocation. The upper end of plate 42 terminates in a forwardly inclined integral tongue 43, the purpose of which will be described. Plate 42 is of stiff metal sheet that retains its shape and has rigidly secured thereto a pin 44 that projects rearwardly through a vertically elongated slide guide slot 45 in wall 16 and terminates in an enlarged external head or button 46 accessible for manipulation by the operator. In the normal disposition of the camera during use, plate 42 tends by its weight to assume its lowermost position which is preferably limited by contact of pin 44 with the lower edge of slot 45 as in Figure 6.

A flat spring metal plate 47, fixed as by rivets 48 to the under surface of top wall 14 extends downwardly and rearwardly and terminates in a narrow upturned rim 49 which is parallel to ledge 35 and preferably at right angles to the plane of plate 47. This is the spring latch that holds cover 12 closed.

As illustrated in Figure 7, when cover 12 is closed, spring plate 47 is maintained sprung downwardly about its effective pivot at the bend adjacent rivets 48 and the rim 49 is snugly cupped behind ledge 35 along surface 37. Thus spring 47 is under stress and also due to the angularity of surface 37 acts upwardly and inwardly to tend to hold cover 12 tightly closed. The relatively steep angularities of surface 37 and rim 49 moreover are such that any outward movement of closed cover 12, as might be urged by the pressure plate springs, will not cam rim 49 downwardly but will exert only substantially a longitudinal or rearward pull on plate 47, so that unless such pull is strong enough to deform rim 49 cover 12 cannot be so opened. In practice plate 47 and rim 49 are preferably made of 34 gauge stainless steel strip which is stiff and resistant to deformation of rim 49 and provides a strong spring beam having an effective pivot at the bend adjacent rivets 48.

In order to open cover 12, it is necessary to disengage rim 49 from ledge 35 by a downward force. In the illustrated embodiment this is done positively through downward displacement of plate 42. As illustrated in Figures 5 and 7, when cover 12 is closed, plate 42 is located near the uppermost part of its permissible vertical displacement with tongue 43 projecting into the space 30 and resting on the top edge of rim 49 and thereby supporting plate 42 with pin 44 in the upper part of slot 45 as illustrated in Figure 5. The camera operator simply pushes downwardly on button 46 to slide tongue 43 downwardly, thereby exerting a positive downward force on the outer end of spring beam 47 which flexes downwardly and inwardly. The downward stroke of tongue 43 is sufficiently long to depress the upper edge of rim 49 to the bottom of ledge tip 38, a condition illustrated in Figure 8. As soon as rim 49 so clears ledge 35, cover 12 is free to swing outwardly about hinge 17 and away from the camera body. The downward pressure being exerted by the operator pushing down on button 46 of course is now converted into cover opening force and the cover starts to open. This condition is illustrated in Figure 9, spring 47 having returned to relaxed condition and plate 42 being in its lowermost position. During the time that spring 47 is returning from the stressed position of Figure 8 to the relaxed position of Figure 9, and after rim 49 slips past rounded ledge end 38, rim 49 contacts and slides upward along surface 36 to thereby exert a resilient outwardly directed force against the cover which coincides with and aids the above described manual action. Also, if the pressure plate springs are under compression they also may aid in pushing rearwardly of the cover after release of the latch. The major cover opening force is, however, the downward pressure exerted by the operator which causes the cover to swing about pivot 17.

In closing the cover, as the upper end of rear wall 16 approaches the rear edge of top wall 14, rim 49 contacts inclined surface 36 whereby spring 47 is flexed downwardly until rim 49 passes over tip 38. By that time the cover is closed as in Figure 7 and plate 47 flexes upwardly to latch rim 49 along surface 37. The location of tongue 43 is important during this closing operation in that it must not become disposed below rim 49. In practice I make slot 45 of such length that the lowermost position of tongue 43 as determined by plate 42 is not below the position illustrated in Figure 9 wherein the front face of tongue 43 is substantially coplanar with surface 36, both being about 30° to the vertical, and tongue 43 remains in space 30. Thus as ledge 35 moves forwardly during closing of cover 12, contact of rim 49 with the front surface of tongue 43 merely results in upward displacement of tongue 43 when rim 49 starts to rise on surface 37, this displacement being resisted substantially only by the weight and friction of slidable plate 42, until when the cover is closed the parts are again disposed as in Figure 7.

While I have disclosed the separational movement of the cover 12 and body 11 as being effected by the downward push on button 46 in conjunction with returning spring 47, it will be appreciated that this can be aided by other springs within the camera such as the pressure plate springs above mentioned.

Also any equivalent method of downwardly displacing plate 47 to release rim 49 from ledge 35, such as a loose vertical plunger in the top wall 14, could also be employed without departing from the spirit of the invention.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a receptacle having a body and a hinged cover providing walls adapted to meet along adjacent edges generally parallel to the hinge axis, a spring plate fixed at its inner end to the interior of said body and extending toward said cover adjacent said body wall edge, an inwardly projecting ledge on said cover adjacent and substantially parallel to said cover wall edge, a rim on said spring plate adapted to latch behind said ledge when the cover is closed, a slidable member internally mounted on said cover adjacent said ledge, said ledge being interrupted intermediate its ends to provide a recess through which said member is adapted to project into contact with the edge of said rim when the cover is closed so that said member may be shifted to flex and disengage said plate from said ledge, and manual operating means for said member available externally of the receptacle.

2. In a receptacle having a body and a hinged cover providing walls adapted to meet along adjacent edges generally parallel to the hinge axis, said body wall being provided with an overhanging flat surface substantially coextensive with a parallel flat end surface on said cover wall when the latter is closed, an elongated plate fixed along its inner end to the interior of said body and projecting past the inner edge of said overhanging flat surface toward said cover adjacent said body wall edge, an integral turned rim on said plate, means on said cover for latching behind said rim when the cover is closed, a latch release member slidably mounted on the internal wall of said cover adjacent said latching means and having a portion projecting inwardly from said cover for engagement with said rim, and an operating head for said latch release member on the exterior of said cover extending through a slot in said cover.

JOHN W. BARNES.

REFERENCES CITED

The following references are of record in the file of this patent:

UNITED STATES PATENTS

| Number | Name | Date |
| --- | --- | --- |
| 195,117 | Frankel | Sept. 11, 1877 |
| 700,343 | Lincoln | May 20, 1902 |
| 1,089,936 | Manent | Mar. 10, 1914 |
| 2,087,884 | Chandler | July 27, 1937 |